United States Patent
Davila et al.

(10) Patent No.: US 6,393,606 B1
(45) Date of Patent: May 21, 2002

(54) INVERSE ASSEMBLER

(75) Inventors: Marco A. Davila; Christopher W. Bunker; Christopher T. Bernard, all of Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/344,642

(22) Filed: Jun. 25, 1999

(51) Int. Cl.[7] ................................................ G06F 9/04
(52) U.S. Cl. .................... 717/127; 717/131; 717/141; 717/134; 717/136; 703/23
(58) Field of Search ............................... 717/4, 5, 8, 9, 717/136, 131, 141; 714/35, 45, 39, 28; 711/1, 2, 3, 4, 5, 101, 103, 119; 712/209, 227; 703/23, 28

(56) References Cited

U.S. PATENT DOCUMENTS

| | | | |
|---|---|---|---|
| 4,694,420 A | | 9/1987 | Pettet et al. ..................... 717/5 |
| 4,879,646 A | * | 11/1989 | Iwasaki et al. .............. 712/227 |
| 5,140,592 A | * | 8/1992 | Idleman et al. ................. 714/5 |
| 5,142,673 A | | 8/1992 | De Angelis et al. .......... 714/35 |
| 5,432,795 A | * | 7/1995 | Robinson ........................ 717/4 |
| 5,586,330 A | * | 12/1996 | Knudsen et al. ............... 717/5 |
| 5,608,891 A | * | 3/1997 | Mizuno et al. .............. 711/114 |
| 5,652,889 A | * | 7/1997 | Sites ............................... 717/8 |
| 5,805,893 A | | 9/1998 | Sproul et al. ................... 717/5 |
| 5,953,526 A | * | 9/1999 | Day et al. ....................... 717/1 |
| 5,966,539 A | * | 10/1999 | Srivastava ...................... 717/9 |
| 6,110,225 A | * | 8/2000 | Bunker et al. .................. 717/4 |
| 6,182,280 B1 | * | 1/2001 | Bunker et al. .................. 717/4 |

* cited by examiner

*Primary Examiner*—Kakali Chaki
*Assistant Examiner*—Chameli C. Das

(57) ABSTRACT

An inverse assembler and converter acquire binary code during inverse assembly of compiled programming code for a software application. A memory image file is generated during compiling of the programming code and a converter is used to trigger a physical address in a memory bus via a logic analyzer. A triggered logical address in the compiled programming code is determined. The triggered logical address is input into the converter. Trigger commands are provided to the logic analyzer that are used to trigger a physical address where binary code is stored in memory. The trigger commands are supplied to the logic analyzer and the memory bus is triggered. The physical address is acquired and converted into a logical address. The memory image file is searched for the logical address. The binary code is acquired from the memory image file at the logical address. The binary code corresponds to only machine code instructions performed during execution of the software application. The binary code is converted into machine code instructions so as to perform the inverse assembly of the compiled programming code for the software application.

20 Claims, 9 Drawing Sheets

INVERSE ASSEMBLER

FIELD OF THE INVENTION

The present invention relates to an inverse assembler that provides code only information during inverse assembly to reduce the number of data acquisition channels used by the logic analyzer and, the present invention converts a logical address into the necessary trigger commands used by a logic analyzer to trigger an associated physical address in memory.

BACKGROUND OF THE INVENTION

1. Statement of the Problem

Typically, microprocessor-based systems are programmed in a high level programming language using programming code, such as, for example, C. The programming code of the high level programming language is converted using a compiler into binary code that corresponds to executable steps performed by the microprocessor. When debugging a software application, the programmer can disassemble the binary code using an inverse assembler which converts the binary code into machine code instructions. These machine code instructions relate to mnemonics that indicate the operations that the microprocessor is performing while executing the software application.

During conventional disassembly, a logic analyzer probes the memory bus connecting the microprocessor to the memory. The memory bus, typically, includes an address bus, a data bus and a status bus. Once the logic analyzer probes the memory bus, the logic analyzer can be triggered to acquire the binary code. The inverse assembler translates the binary code into a machine code instruction (mnemonic). The programmer can then determine the operations that the microprocessor is performing by viewing the actual machine code instructions translated by the conventional inverse assembler, and therefore, the programmer obtains valuable insight to assist in debugging any problems associated with the software application.

As mentioned above, the conventional inverse assembler relies on a logic analyzer to probe and acquire data from the memory busses. The logic analyzer includes data acquisition cards that have a finite number of channels used to obtain the binary code from the memory busses. The logic analyzer and data acquisition cards are expensive. Some programmers desire an inexpensive alternative to these expensive logic analyzers to obtain machine code information relating to a software application. In addition, other programmers desire to have the finite number of channels on the data acquisition card available to probe other information during debugging.

Therefore, a need exists for an inverse assembler that reduces the number of data acquisition channels used by the logic analyzer during disassembly, and a need exists for an inverse assembler that reduces costs associated with probing the memory busses, in particular, the data bus, using the logic analyzer.

During debugging of the memory busses, the programmer must setup the trigger specification for the logic analyzer correctly. Usually, the programmer wishes to view data at a particular address on the memory bus. In order to view this data, the programmer must determine a logical address assigned to the binary code and translate that logical address to a physical address in memory. In earlier conventional microprocessors, the translation of logical address to physical address was not difficult. Typically, the logical address was the same as the physical address. However, with newer microprocessor and memory controllers, the translation between the logical address into the physical address is no longer standard and has become increasingly complex. Unlike earlier conventional microprocessors and memory controllers that used the logical address as the physical address, current memory controllers such as for example, SDRAM and DRAM on-chip memory controllers, typically, provide non-logical addresses as physical addresses in memory. With these newer microprocessors, the programmer must have intimate knowledge of the microprocessor in order to properly trigger the physical address. If the programmer does not have this knowledge, the programmer does not have the ability to obtain the proper conversion between the logical address and the physical address. Therefore, the incorrect binary code can be acquired by the logic analyzer and input to the inverse assembler. Therefore, the machine code instructions are incorrect and debugging the software application becomes futile.

Thus, a need exists for an apparatus and method that understands the microprocessor and memory controller and converts a logical address into a physical address for the programmer and sets up the logic analyzer to trigger the physical address such that the programmer does not require an intimate knowledge of the memory mapping techniques used by the microprocessor.

SUMMARY OF THE INVENTION

1. Solution to the Problem

The present invention includes an inverse assembler that provides code only information and, therefore, reduces the number of logic analyzer channels used during inverse assembly. In addition, the present invention also provides an inverse assembler whose requirements are less expensive than conventional inverse assemblers that probe all memory busses during inverse assembly. Also, the present invention provides a trigger tool that understands the microprocessor and the memory controller to convert a logical address into trigger commands used by the logic analyzer to trigger an associated physical address in memory for the programmer without requiring the programmer to have intimate knowledge of the memory mapping techniques of the microprocessor.

2. Summary

The present invention provides a method for inverse assembly of a software application. During compiling of programming code, a memory image file is generated. During inverse assembly in the present invention, a logical address is determined that indicates a location of a binary code in memory. The memory image file is searched for the logical address. The binary code is acquired from the memory image file at the logical address. The binary code corresponds to only machine code instructions performed during execution of the software application. The binary code is converted into machine code instructions so as to perform the inverse assembly of the compiled programming code for the software application.

In another aspect of the present invention, a method for acquiring binary code during inverse assembly of compiled programming code for a software application is provided. The present invention uses a converter (trigger tool) to trigger a physical address in a memory bus via a logic analyzer. A triggered logical address in the compiled programming code is provided. The triggered logical address is input into the converter. Trigger commands are provided that convert the triggered logical address and step up the logic analyzer to trigger the associated physical address where the binary code is stored in memory. The trigger commands are supplied to the logic analyzer and the memory bus is triggered using the logic analyzer. The binary code is acquired from the memory bus and the binary code is converted into machine code instruction or a data value so as to perform inverse assembly on the software application.

DETAILED DESCRIPTION OF THE INVENTION

A. Overview

Figure 1:
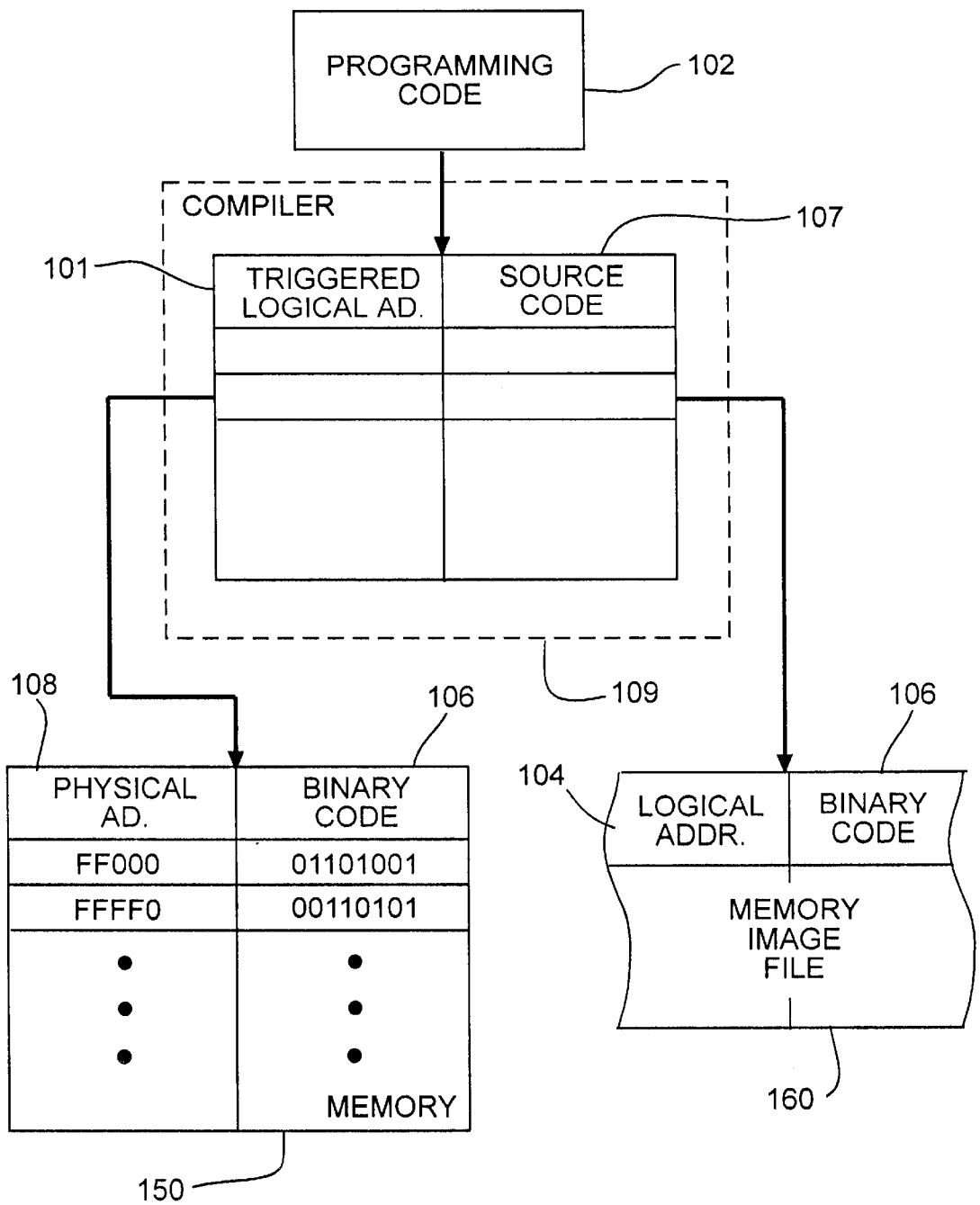
FIG. 1 is a prior art compiler showing programming code being compiled into binary code.
Figure 2:
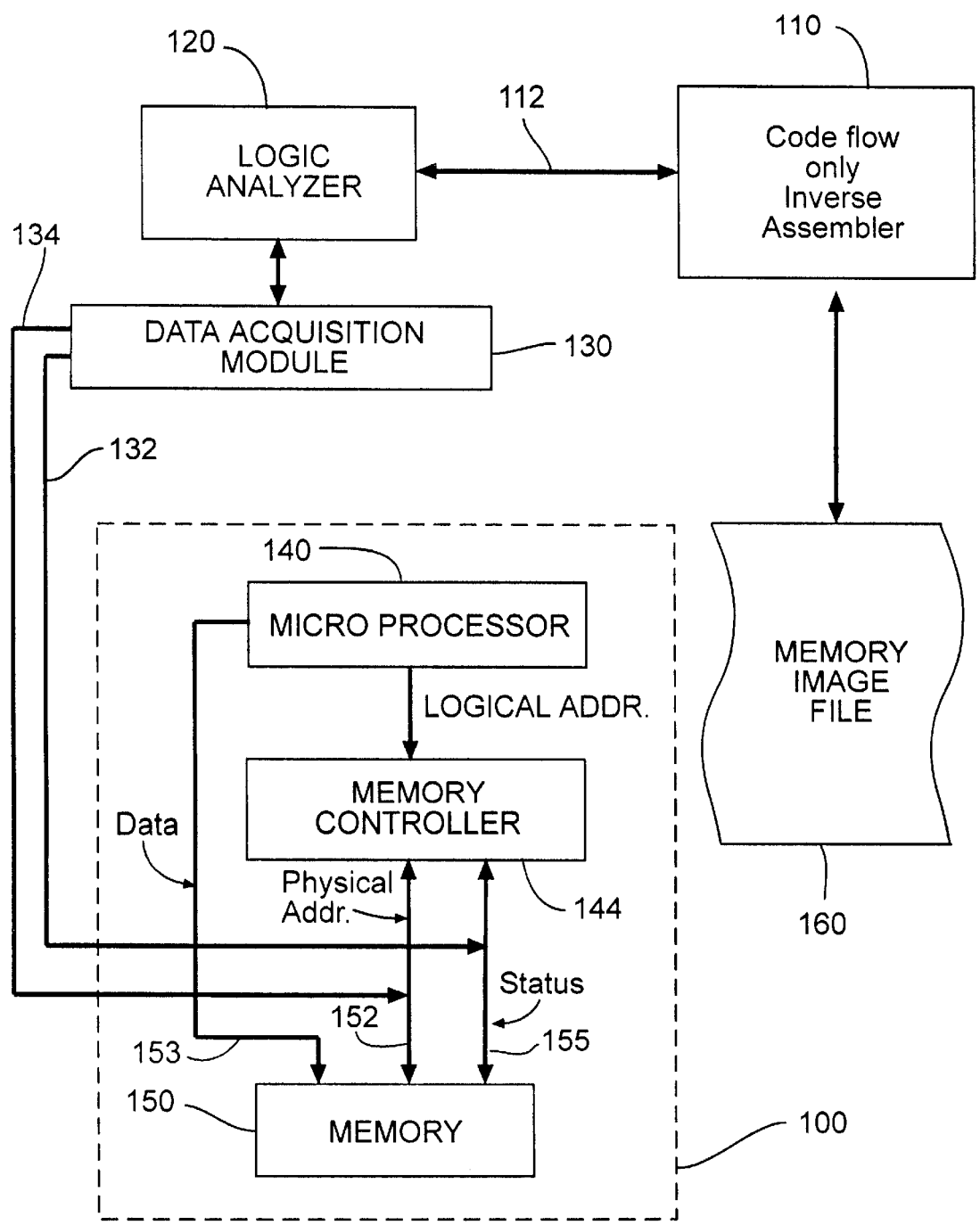
FIG. 2 is a highly simplified view of a microprocessor based system and the code flow only inverse assembler of the present invention.
Figure 3:
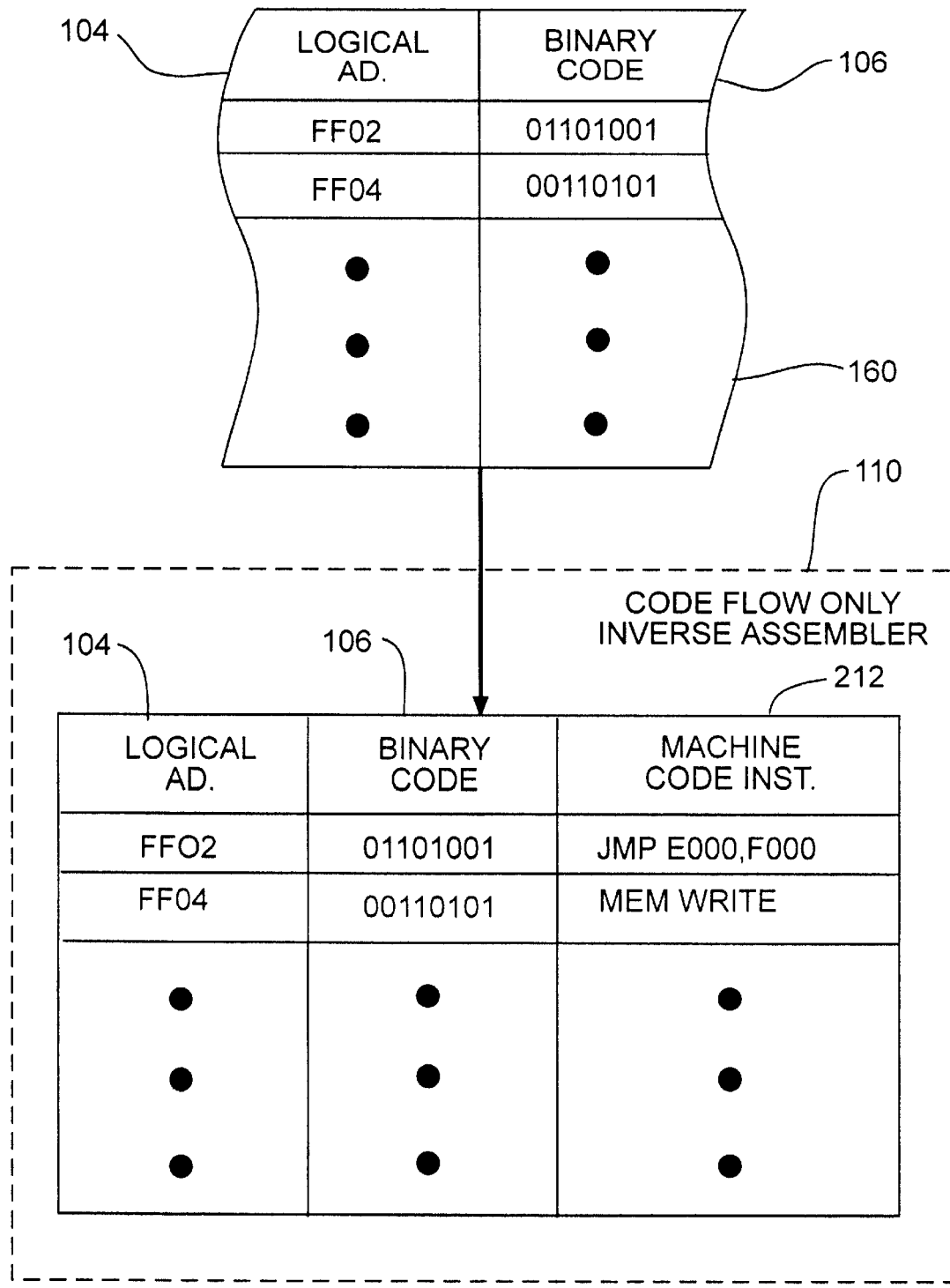
FIG. 3 is a block diagram view of an inverse assembler of the present invention disassembling the memory image file into machine code instructions.

As shown in FIGS. 1, 2 and FIG. 3, a highly simplified microprocessor-based system 100 includes a microprocessor 140 having a memory controller 144 and a memory 150. The following description of the microprocessor 140 and the compiling of the software application are conventionally known in the art and are provided as for explanatory purposes in the description of the present invention. The microprocessor 140 executes instructions provided in software applications. The memory controller 144 is connected to the memory 150 via a memory bus containing a data bus 153, a physical address bus 152 and a status bus 155. During execution of a software application, the microprocessor 140 supplies a logical address 104 to the memory controller 144 that converts the logical address 104 into a physical address 108 in memory 150. The memory controller 144 converts the logical address 104 into the physical address 108 and supplies the physical address 108 via physical address bus 152 to the memory 150. The memory controller 144 also passes status information via status bus 155 to the memory 150. In addition, the microprocessor 140 supplies the binary code 106 (data) to the memory 150 via data bus 153. Therefore, the binary code 106 is stored at the physical address 108 in memory 150. The microprocessor-based system 100, typically, includes other components such as mass storage devices, display devices and interfaces that are not shown for ease of illustration.

In FIGS. 1, 2 and 3, software applications used to instruct the microprocessor-based system 100 are written in programming code 102 using a programming language, such as, for example, C. The programming code 102 is compiled by a conventional compiler 109, and each line of source code 107 is assigned a triggered logical address 101. The compiler 109 also converts the programming code 102 into binary code 106, and the compiler 109 creates a memory image file 160. The memory image file 160 contains the binary code 106 and an associated logical address 104. The memory image file 160 is an image of only the machine code instructions 212 performed by the microprocessor 140 during execution of the software application. The machine code instructions 212 are stored in the memory image file 150 in binary code 106. The machine code instructions 212 related to mnemonics that indicate operations performed by the microprocessor 140 during execution of the software application and review of the machine code instructions 212 as the software application executes is code flow analysis. However, data values used by the software application are not available when reviewing at the memory image file 160. For example, the data values include any constant or variable values that are used by the software application, and this data is not stored in the memory image file 160 when the memory image file 160 is created during compiling the software application. It is noted that these data values are stored in memory 150. These data values can only be obtained by triggering the appropriate physical address 108 in memory 150 with the logic analyzer 120.

Figure 4:
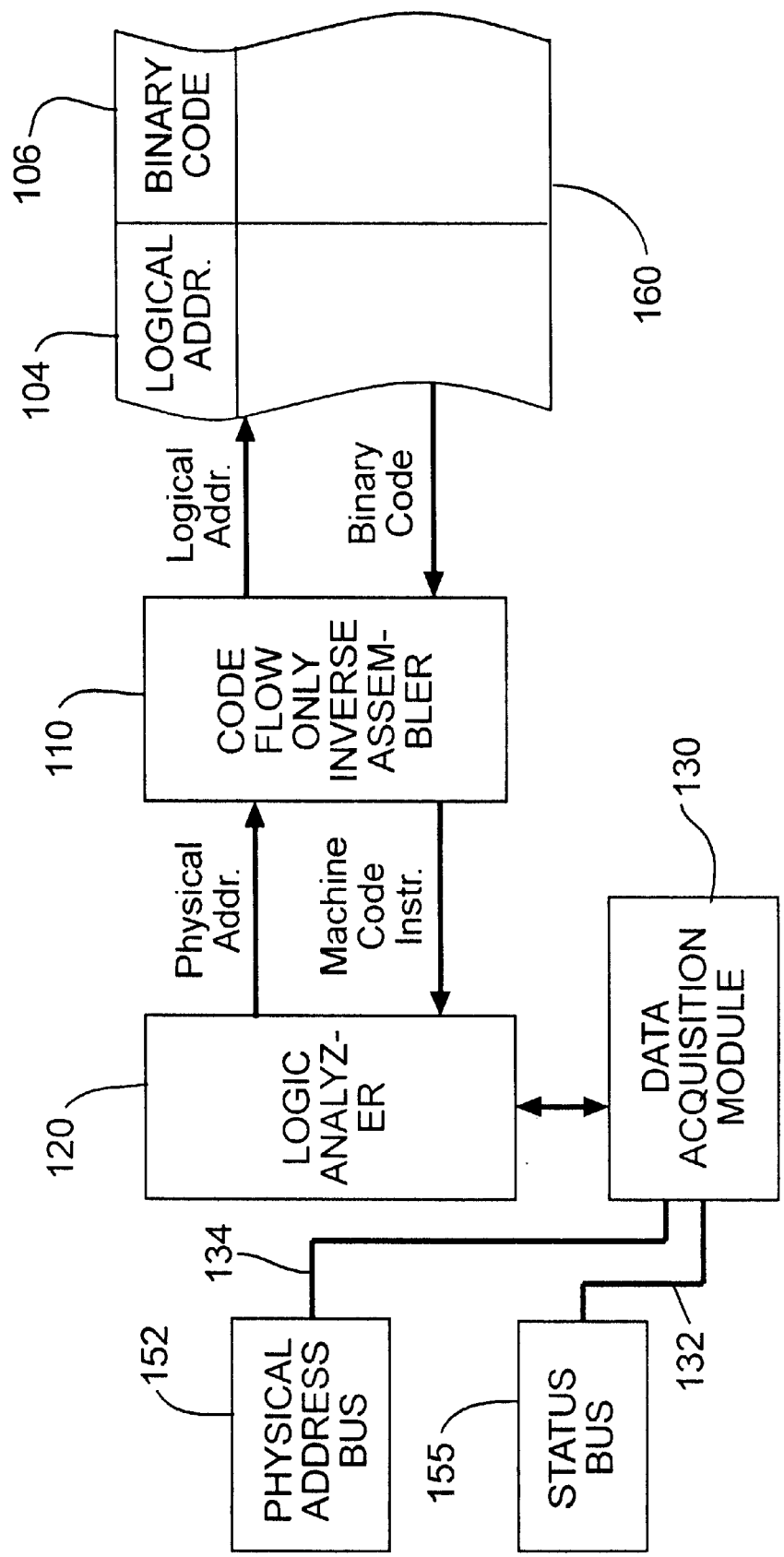
FIG. 4 is a block diagram view of an inverse assembler of the present invention.

In FIGS. 2, 3 and 4, a code flow only inverse assembler 110 of the present invention determines the machine code instructions 212 from inspecting the memory image file 160 rather than having a conventional logic analyzer 120 probe the data bus 153. By using the memory image file 160, the number of channels on the data acquisition module 130 used by the logic analyzer 120 during inverse assembly is reduced because the data bus 153 is not used. Instead, the information accessed by the conventional inverse assemblers that probe the data bus 153 is acquired by using the memory image file 160. Therefore, using only the memory image file 160 to obtain code-only information reduces logic analyzer 120 expenses because the logic analyzer 120 is not required to probe the data bus 153 and, therefore, less channels in the data acquisition module 130 are required to perform the inverse assembly of the software application.

The code flow only inverse assembler 110 provides a subset of features at a much lower cost than conventional inverse assemblers and emulation solutions. The code-flow only inverse assembler 110 of the present invention retrieves instructions for disassembly only from the memory image file 160, thereby greatly reducing the number of signals the logic analyzer 120 must analyze. The use of code flow only is user friendly to software designers who have viewed the conventional inverse assemblers as too expensive, too complicated and geared for hardware designers.

Figure 5:
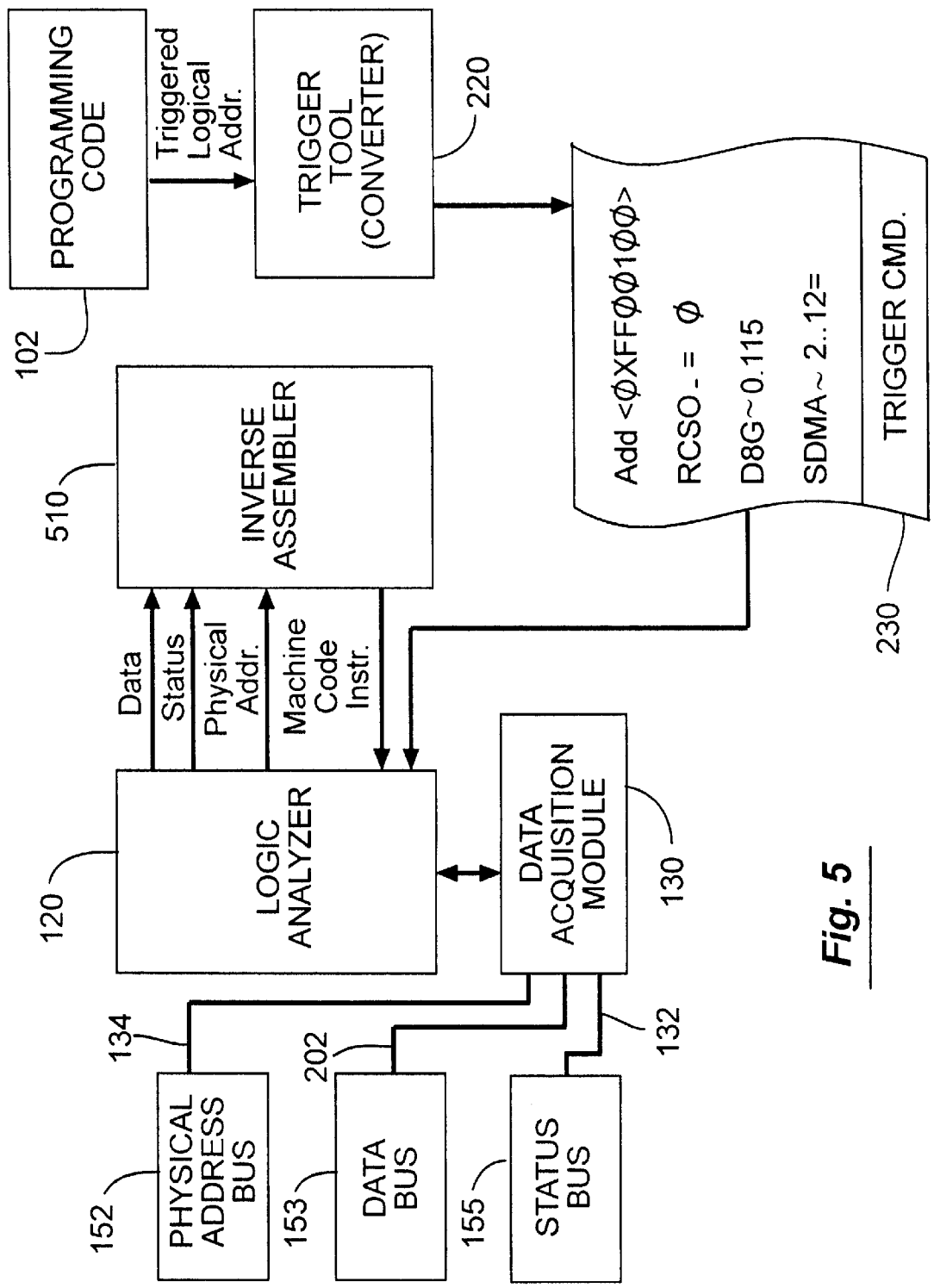
FIG. 5 is a block diagram view a trigger tool of the present invention.

In the present invention, as shown in FIG. 5, a trigger tool 220 (converter) is provided that is programmed with the memory mapping used by the microprocessor 140 and/or the memory controller 144. The trigger tool 220 provides the translation between the triggered logical address 101 and the physical address 108. Since memory mapping is highly dependent on the type of microprocessor 140, the trigger tool 220 determines the memory mapping used by the microprocessor 140 and/or memory controller 144 to convert the triggered logical address 101 into trigger commands 230 used by the logic analyzer 120 to trigger the associated physical address 108. As such, the trigger tool 220 provides trigger commands 230 used by the logical analyzer 120 to convert the triggered logical address 101 and to trigger the physical address 108. Therefore, the logic analyzer 120 via the data acquisition module 130 can trigger the physical address bus 152, the data bus 153 and the status bus 155 to ultimately receive the binary code 106 (data) that the inverse assembler 110 uses to convert into the machine code instructions 212 which are supplied to the logical analyzer 120 and displayed to the programmer. Therefore, the programmer is not required to have an intimate knowledge of the memory mapping used by the microprocessor 140. It should be appreciated that, in one embodiment, the machine code instructions 212 are supplied to the logic analyzer 120 where they are viewed by the programmer. However, in another embodiment, the machine code instructions 212 are not supplied to the logic analyzer 120 and are provided to the programmer through another device such as, for example, a display device. It should be noted that the present invention should not be interpreted to be limited by the manner in which the machine code instructions 212 are provided to the programmer for review.

It should also be appreciated that in one embodiment the physical address bus 152 and the status bus 155 are 32-bit and the data bus 153 is 64 bit. However, it should be expressly understood that the inverse assembler 510 and the trigger tool 220 are not limited to the bit size of the memory busses (physical address bus 152, data bus 153 and status bus 155). As such, the present invention is independent of the bit size of the information being analyzed.

In the present invention, the trigger tool 220 provides trigger commands 230 to the logic analyzer 120 without requiring the programmer to have knowledge of the trigger commands 230. As such, the use of the trigger tool 220 simplifies the setup of the logic analyzer 120 by converting the triggered logical address 101 into trigger commands 230 used by the logic analyzer 120 to trigger the physical address 108 such that software designers/programmers are not required to have intimate knowledge of the microprocessor 140 and the memory controller 144 being used.

B. Code Flow Only Inverse Assembler

As shown In FIG. 2, the code flow only inverse assembler 110 of the present invention is connected to a conventional logic analyzer 120 for ease of illustration via line 112. The code flow only inverse assembler 110 is typically a software program that is run by the logic analyzer 120. The logic analyzer 120 is connected to a conventional data acquisition module 130. The data acquisition module 130 includes a finite number of channels (not shown) that are used to probe the physical address bus 152, and the status bus 155. In one embodiment, the data acquisition module 130 has 64 channels used to probe the physical address bus 152 (12 bit) and the status bus 155 (32 bit). It should be noted that the embodiment where the data acquisition module 130 has 64 channel is an example only and the logic analyzer 120 and the data acquisition module 130 should not be interpreted as being limited to the embodiment disclosed herein.

The logic analyzer 120 is connected via the data acquisition module 130 to the physical address bus 152 and the status bus 155 via lines 134 and 132, respectively which are connected to channels (not shown) in the data acquisition module 130. In one embodiment, the memory 150 is located externally to the microprocessor 140 and connected via memory controller 144. It should be appreciated that, in another embodiment, the memory 150 and memory controller 144 can be located externally from the microprocessor 140, and the present invention should not be limited to the embodiment shown in FIG. 2. It should be appreciated that the connection between the memory 150 and the memory controller 144 can be connected in any number of techniques known in the art, and the present invention should not be interpreted as being limited to the embodiment shown in FIG. 2.

As explained above and shown in FIGS. 1, 2 and 3, when the programming code 102 of the software application is compiled each line of source code 107 is assigned a triggered logical address 101, and a memory image file 160 is created. The memory image file 160 includes logical address 104 and binary code 106 that relates to machine code instructions 212 which are commands executed by the microprocessor 140. The triggered logical address 101 and the logical address 104 are, typically different values. The triggered logical address 101 is associated with the source code 107 in a symbol file during compiling while the logical address 104 is provided to the microprocessor 140 and the memory controller 144 where the memory controller 144 converts the logical address 104 into a physical address 108 in memory 150. The logical address 104 is also found in the memory image file 160 and associated with binary code 106 that relates to the machine code instructions 212. When the code flow only inverse assembler 110 receives the physical address 108, a corresponding logical address 104 is determined through a conversion within the code flow only inverse assembler 110. This conversion between the physical address 108 and the corresponding logical address 104 within the code flow only inverse assembler 110 is known in the art, and is highly microprocessor 140 specific. It should be appreciated that the present invention encompasses any such conversions practiced in the art.

The memory image file 160 contains only code flow information. Data values used during the execution of the programming code 102 of the software application are not stored in the memory image file 160. Data values include constant or variable information used by the programming code 102 of the software application. In FIG. 3, for example, the logical address 104 is FF04, the binary code 106 is 00110101, the machine code instruction 212 is MEM WRITE and what the memory image file 160 does not include, for example, would be the value actually written as a result of this machine code instruction 212.

Therefore, the memory image file 160 provides only machine code instructions 212 relating to the operative steps taken by the microprocessor 140 during execution of the software application. The code flow only inverse assembler 110 of the present invention uses the memory image file 160 to obtain only the machine code instructions 212 during inverse assembly. It should be appreciated that the memory image file 160 can be any file containing a memory image of the software application supplied during compiling, such as, but not limited to: S-record, elf, coff, plain binary, intel hex files, etc. The memory image file 160 can also be a text file, a database file or any other appropriate file format. As mentioned above in one embodiment, the code flow only inverse assembler 110 is a software program that is executed by the logic analyzer 120, and in this embodiment, the memory image file 160 also resides in the logic analyzer 120. In another embodiment, the memory image file 160 can be located externally from the code flow only inverse assembler 110 and the logic analyzer 120.

Figure 7:
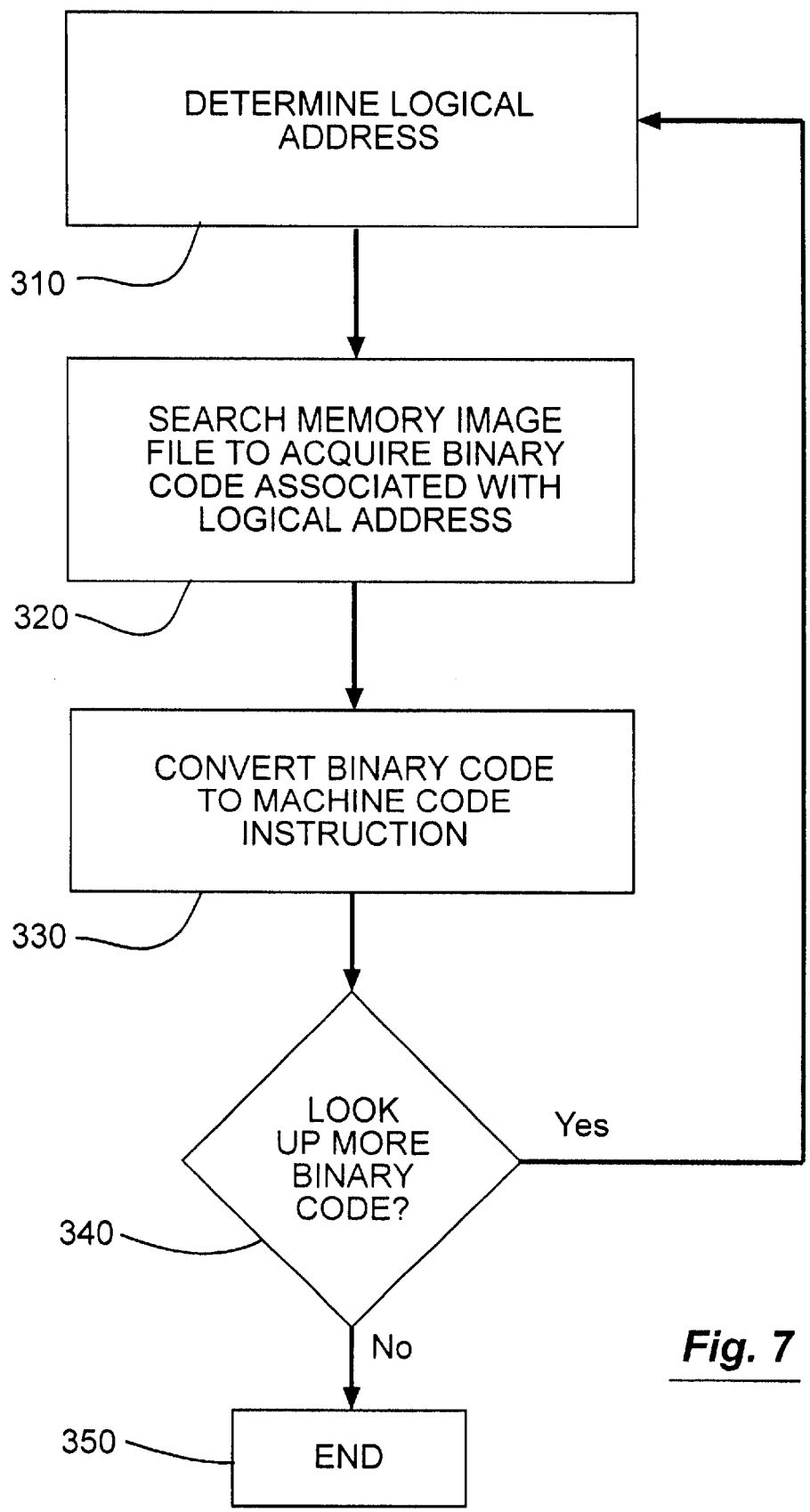
FIG. 7 is a flow chart of a code flow only inverse assembler method.
Figure 8:
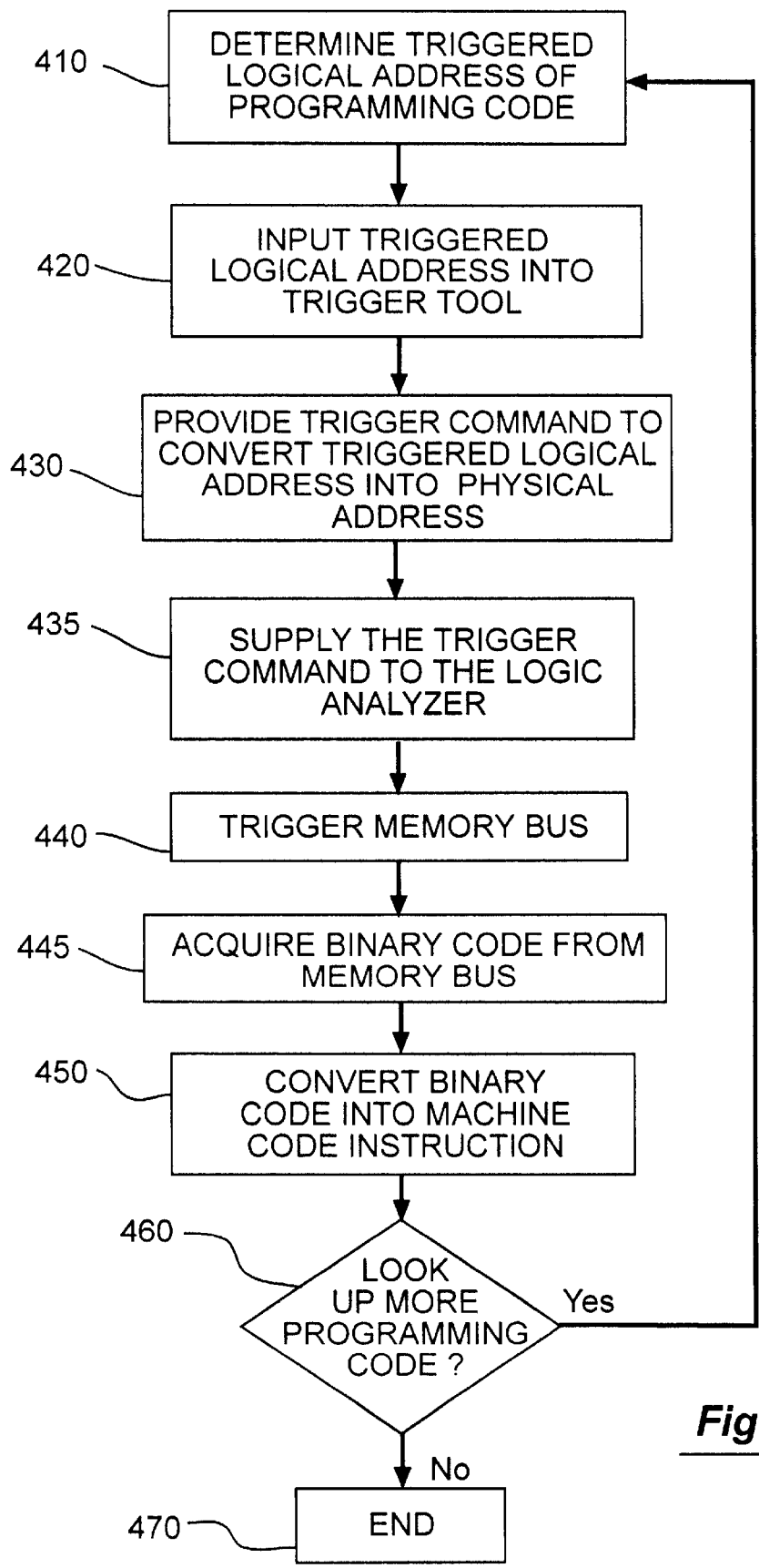
FIG. 8 is a flow chart of a memory trigger method used to convert a logical address into trigger commands used by a logic analyzer to trigger a physical address.

As shown in FIGS. 2, 4 and 7, a method is shown for inverse assembly of compiled programming code for a software application.

During compiling, a memory image file 160 is created. In this method, the code flow only inverse assembler 110 determines the logical addresses 104 assigned to the programming code 102 of the software application (step 310). In one embodiment of determining the logical address 104

(step 310), the physical address bus 152 and the status bus 153 are probed by the data acquisition module 130 of the logic analyzer 120. As a result, the physical address 108 corresponding to the binary code 106 is received by the logic analyzer 120, and the physical address 108 is supplied to the code flow only inverse assembler 110. The physical address 108 is converted by the code flow only inverse assembler 110 into the logical address 104. It should be appreciated that the logical address 104 can be determined by any method known in the art, and the present invention should not be limited to only those disclosed herein.

For each logical address 104, the code flow only inverse assembler 110 searches the memory image file 160 to acquire the binary code 106 associated with the logical address 104 (step 320). In one embodiment, the searching of the memory image file 160 is a text search. It should be appreciated that the method used to search the memory image file 160 is dependent upon the type (text, database, etc.) of memory image file 160 that is created during compiling the programming code 102. The binary code 106 is converted into machine code instructions 212 by the code flow only inverse assembler 110 (step 330). This conversion (step 330) of the binary code 106 is a conventional conversion that is known to those practicing in the art.

If more binary code 106 is required (step 340), the code flow only inverse assembler 110 determines the next logical address 104 (step 310). If no other binary code 106 is required (step 340), the code flow only inverse assembler 110 finishes working (step 350). The machine code instructions 212 provided during this inverse assembly are examined by a programmer during debugging of the software application.

As shown in FIG. 4, the code flow only inverse assembler 110 does not probe the data bus 153 (FIG. 2). Hence, the logic analyzer 120 does not require additional channels (64 channels correspond to a data bus 153 having 64 bits) when disassembling the software application. Therefore, the present invention is less expensive to use than conventional inverse assemblers. It should be appreciated that the code flow only inverse assembler 110 described above is one embodiment of the present invention. In addition, the present invention should be interpreted as encompassing any inverse assembler that uses a memory image file 160 to obtain machine code instructions 212 without having to probe the data bus 153 using a logic analyzer 120.

C. Trigger Tool

As mentioned previously, in FIGS. 2 and 5, each microprocessor 140 and memory controller 144 have different methods of converting a triggered logical address 101 into a physical address 108 in memory 150 (memory mapping) where binary code 106 is stored. In the present invention, a trigger tool 220 (also termed a converter) is provided uses the triggered logical address 101 to provide trigger commands 230 to the logic analyzer 120 that are used by the logic analyzer 120 to trigger the physical address 108. As such, the programmer is not required to know the details relating to the memory mapping used by the microprocessor 140 and the memory controller 144. In one embodiment, the trigger tool 220 can be an integral component of the software-based inverse assembler 110, and the trigger tool 220 is part of the inverse assembler 110 software program. However in another embodiment, the trigger tool 220 can be a stand-alone program that is used in conjunction with the inverse assembler 110, and the trigger tool 220 is a software program that is separate and apart from the inverse assembler 110.

As mentioned above, in FIGS. 5 and 7, each line of source code 107 from the programming code 102 is assigned a triggered logical address 101. The trigger tool 220 of the present invention determines the triggered logical address 101 of the compiled programming code 102 (step 410). The triggered logical address 101 is input into the trigger tool 220 (step 420). In one embodiment for inputting the triggered logical address 101 into the trigger tool 220, the programmer manually inputs the triggered logical address 101 in the trigger tool 220. In another embodiment of inputting the logical address 104 into the trigger tool 220, the programmer can point to a line of source code 107 of the programming code 102 using, for example, a cursor (not shown) and the triggered logical address 101 is automatically input into the trigger tool 220. It should be appreciated that the embodiments described for inputting the triggered logical address 101 into the trigger tool 220 are not meant to limit the present invention to those embodiments disclosed herein. The present invention should encompass any method for inputting the triggered logical address 101 into the trigger tool 220 that is known in the art.

Once the triggered logical address 101 has been input into the trigger tool 220, trigger commands 230 are provided by the trigger tool 220 (step 430). The trigger commands 230 are commands that are executable by the logic analyzer 120 to convert the triggered logical address 101 into the physical address 108 in memory 150 (step 430). The conversion of the triggered logical address 101 into trigger commands 230 is performed by determining the memory mapping used by the microprocessor 140 and memory controller 144. The trigger commands 230 are, typically, programmed as part of the software of the trigger tool 220. In one embodiment of providing the trigger commands 230, the trigger commands 230 used by the logic analyzer 120 to trigger the physical address 108 are provided by adding a constant value to the triggered logical address 101. In another embodiment of providing the trigger commands 230, the trigger commands 230 required to trigger the physical address 108 are a series of complex instructions that are provided with the specifications of the microprocessor 140, and in the present invention, these logical commands 230 are programmed into the software of the trigger tool 220.

The trigger commands 230 are supplied to the logic analyzer 120 (step 435). In one embodiment of supplying, the programmer can cut and paste the trigger commands 230 and manually input them into the logic analyzer 120. In another embodiment of supplying the triggered logical address 101 into the trigger tool 220, once the triggered logical address 101 is input into the trigger tool 220 (by the programmer or automatically), the trigger commands 230 are automatically supplied via a software function to the logic analyzer 120. It should be appreciated that the embodiments described for supplying the triggered logical address 101 Into the trigger tool 220 are not meant to limit the present invention to those embodiments disclosed herein. The present invention should encompass any method for supplying the triggered logical address 101 into the trigger tool 220 that is known in the art.

Once the trigger commands 230 used by the logic analyzer 120 and the physical address 108 are known, the physical address bus 152, the data bus 153, and the status bug 155 are triggered by the logic analyzer 120 via the data acquisition module 130 and lines 134, 202 and 132, respectively. At the physical address 108, the logic analyzer 120 acquires the binary code 106 in memory 150 (step 440), and the physical address 108, binary code 106 (data) and status information is supplied to the inverse assembler 510. The binary code 106 is then converted by the inverse assembler 510 into machine code instructions 212 (step 450) and supplied to the logic analyzer 120 where the programmer analyzes the machine code instructions 212. It should be appreciated that, in one embodiment, the machine code instructions 212 are supplied to the logic analyzer 120 where they are viewed by the programmer. However, in another embodiment, the machine code instructions 212 are not supplied to the logic analyzer 120 and are provided to the programmer through another device such as, for example, a display device. It should be noted that the present invention should not be interpreted to be limited by the manner in which the machine code instructions 212 are provided to the programmer for review.

If more programming code 102 is analyzed (step 460), the logical address 104 of the next programming code 102 is determined (step 410). If no other programming code 102 is required (step 460), the code flow only inverse assembler 110 finishes working (step 470).

Although the trigger tool 220 is disclosed with the inverse assembler 510, it should also be appreciated that the trigger tool 220 can be used with any inverse assembler, such as, for example, a code flow only inverse assembler 110 that does not probe the data bus 153 during inverse assembly. As will be explained below, the trigger tool 220 will provide the trigger commands 230 from the triggered logical address 101, and the logic analyzer will trigger the physical bus 152 and acquire the physical address 108. The physical address 108 can be converted into the logical address 104, and the memory image file 160 can be searched for the binary code information 106.

D. Code Flow Only Inverse Assembler With Trigger Tool

Figure 6:
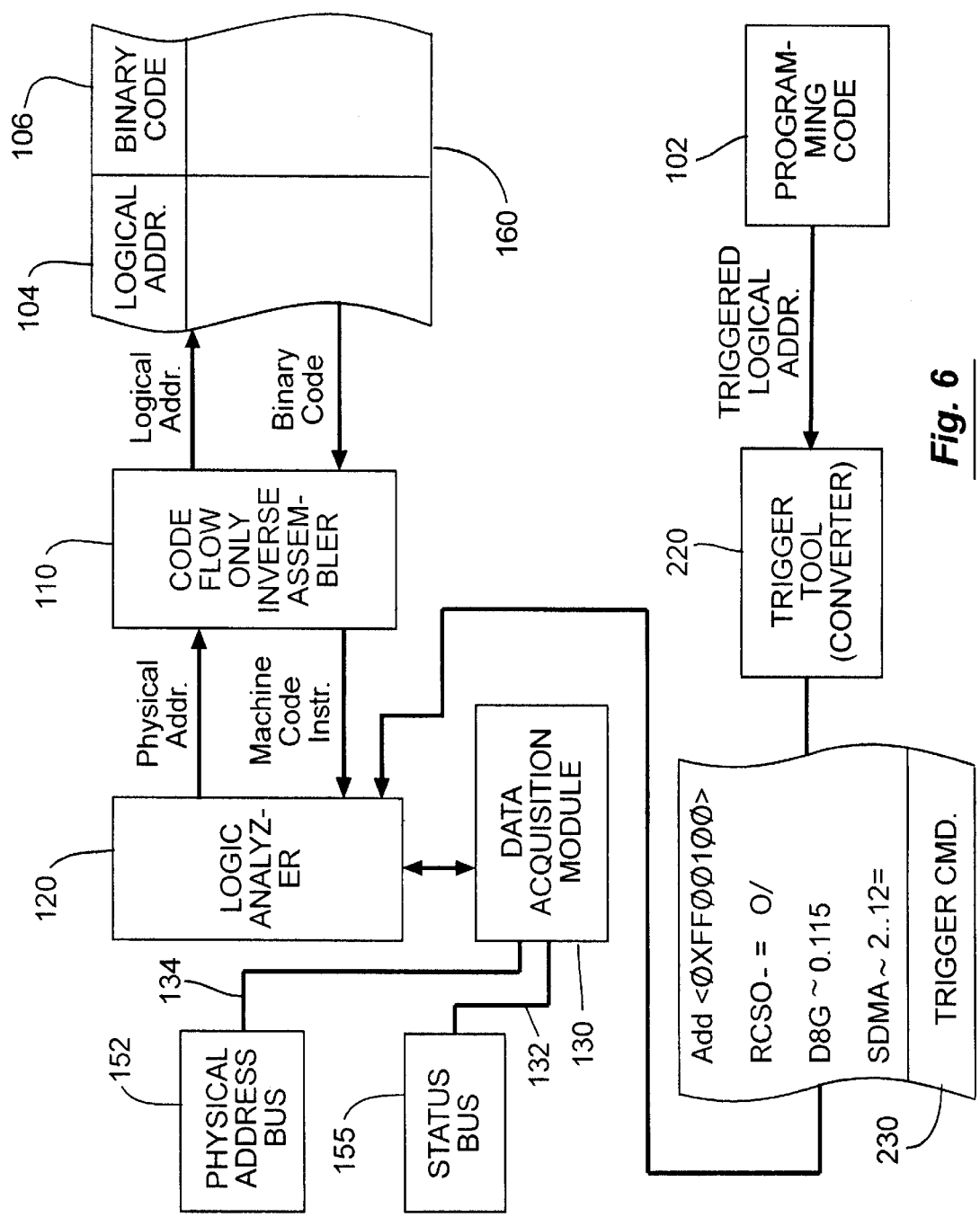
FIG. 6 is a block diagram view of an inverse assembler using a trigger tool of the present invention.
Figure 9:
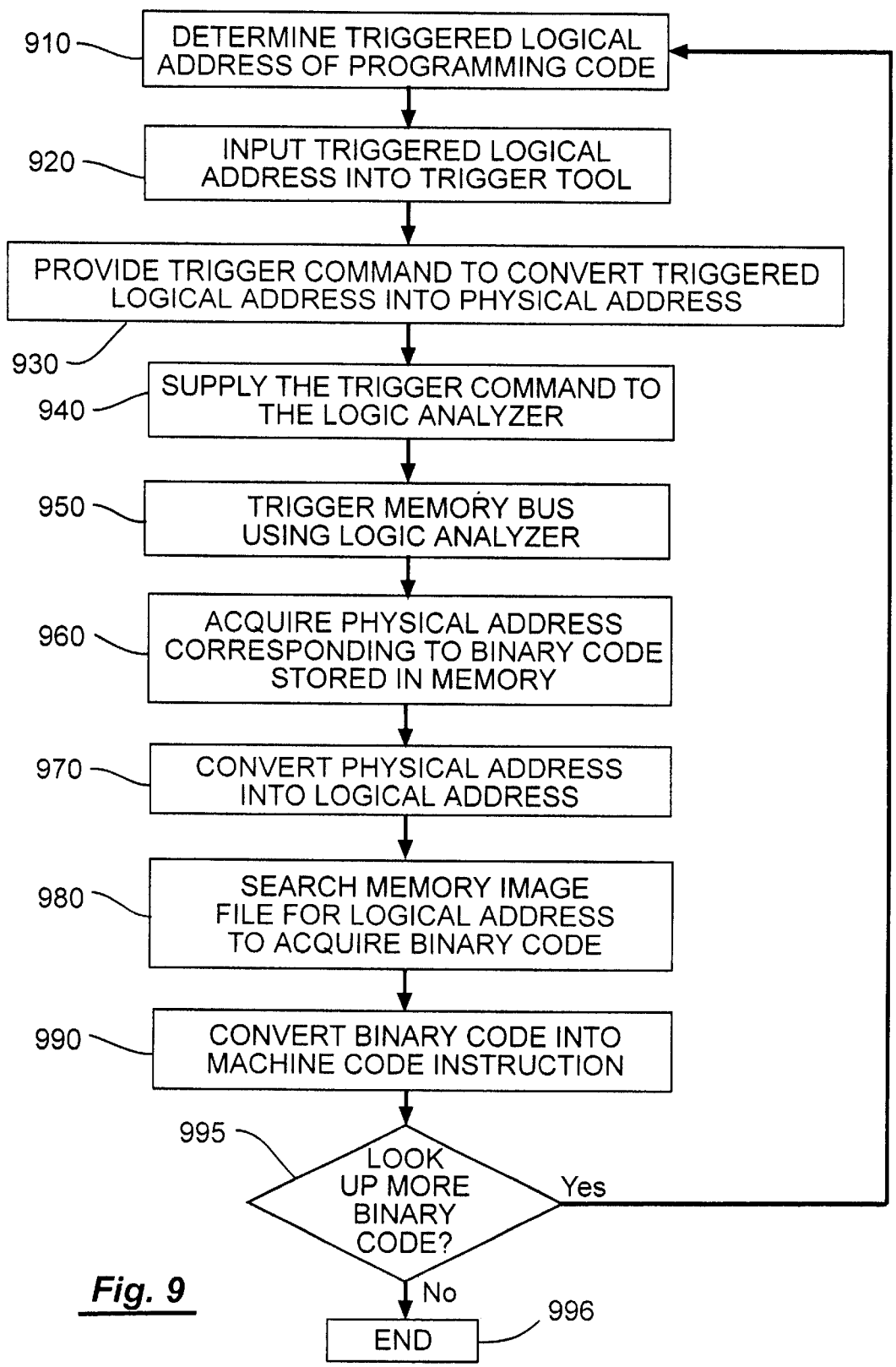
FIG. 9 is a flow chart of a code flow only inverse assembler method using a memory trigger method to convert a logical address into trigger commands used by a logic analyzer to trigger a physical address.

As shown in FIGS. 6 and 9, the code flow inverse assembler 110 uses the trigger tool 220 to acquire the physical address 106 corresponding to the binary code 106 in memory 150. However, instead of probing the data bus 153 (FIG. 2) for the binary code 106, the code flow only inverse assembler 110 converts the physical address 108 into the logical address 104 and acquires the binary code 106 from the memory image file 160.

In the present invention, the trigger tool 220 determines the triggered logical address 101 of the programming code 102 (step 910). The triggered logical address 101 is input into the trigger tool (step 920). In one embodiment for inputting the triggered logical address 101 into the trigger tool 220, the programmer manually inputs the triggered logical address 101 in the trigger tool 220. In another embodiment of inputting the logical address 104 into the trigger tool 220, the programmer can point to a line of source code 107 of the programming code 102 using, for example, a cursor (not shown) and the triggered logical address 101 is automatically input into the trigger tool 220. It should be appreciated that the embodiments described for inputting the triggered logical address 101 into the trigger tool 220 are not meant to limit the present invention to those embodiments disclosed herein. The present invention should encompass any method for inputting the triggered logical address 101 into the trigger tool 220 that is known in the art.

The trigger tool 220 provides trigger commands 230 from the triggered logical address 101, and the trigger commands 230 are used by the logic analyzer 120 to trigger the physical address 108 (step 940). In one embodiment of providing the trigger commands 230, the trigger commands 230 used by the logic analyzer 120 to trigger the physical address 108 are provided by adding a constant value to the triggered logical address 101. In another embodiment of providing the trigger commands 230, the trigger commands 230 required to trigger the physical address 108 are a series of complex instructions that are provided with the specifications of the microprocessor 140, and in the present invention, these logical commands 230 are programmed into the software of the trigger tool 220.

The trigger commands 230 are supplied to the logic analyzer 120 (step 950). In one embodiment of supplying, the programmer can cut and paste the trigger commands 230 and manually input them into the logic analyzer 120. In another embodiment of supplying the triggered logical address 101 into the trigger tool 220, once the triggered logical address 101 is input into the trigger tool 220 (by the programmer or automatically), the trigger commands 230 are automatically supplied via a software function to the logic analyzer 120. It should be appreciated that the embodiments described for supplying the triggered logical address 101 into the trigger tool 220 are not meant to limit the present invention to those embodiments disclosed herein. The present invention should encompass any method for supplying the triggered logical address 101 into the trigger tool 220 that is known in the art.

The logic analyzer 120 triggers the memory bus (physical address bus 152 and the status bus 155 only) (step 950). The logic analyzer acquires the physical address 108 that corresponds to the binary code 106 (step 960), and the physical address 108 is supplied to the code flow only inverse assembler 110 where the physical address is converted into the logical address 104 (step 970). When the code flow only inverse assembler 110 receives the physical address 108, the logical address 104 is determined through a conversion within the code flow only inverse assembler 110. This conversion between the physical address 108 and the logical address 104 within the code flow only inverse assembler 110 is known in the art, and it should be appreciated that the present invention encompasses any such conversions practiced in the art.

The memory image file 160 is searched for the logical address 104 and the corresponding binary code 106 is acquired (step 980). It should be appreciated that the method used to search the memory image file 160 is dependent upon the type (text, database, etc.) of memory image file 160 that is created during compiling the programming code 102. The binary code 106 is converted into machine code instructions 212 by the code flow only inverse assembler 110 (step 330). This conversion (step 330) of the binary code 106 is a conventional conversion that is known to those practicing in the art. It should be appreciated that the memory image file 160 can be any file containing a memory image of the software application supplied during compiling, such as, but not limited to: S-record, elf, coff, plain binary, intel hex files, etc. The memory image file 160 can also be a text file, a database file or any other appropriate file format. As mentioned previously in one embodiment, the code flow only inverse assembler 120 is a software program executed by the logic analyzer 120, and the memory image file 160 also reside in the logic analyzer 120. In another embodiment, the memory image file 160 can be located externally from the code flow only inverse assembler 110 and the logic analyzer 120.

The binary code 106 is converted to machine code instructions 212 (FIG. 3) by the code flow only inverse assembler 110 (step 990). The machine code instructions 212 are supplied to the logic analyzer 120 where they are analyzed by the programmer. It should be appreciated that, in one embodiment, the machine code instructions 212 are supplied to the logic analyzer 120 where they are viewed by the programmer. However, in another embodiment, the machine code instructions 212 are not supplied to the logic analyzer 120 and are provided to the programmer through another device such as, for example, a display device. It should be noted that the present invention should not be interpreted to be limited by the manner in which the machine code instructions 212 are provided to the programmer for review.

If more binary code 106 is required (step 995), the code flow only inverse assembler 110 determines the next logical address 104 (step 910). If no other binary code 106 is required (step 995), the code flow only inverse assembler 110 finishes working (step 996). The machine code instructions 212 provided during this inverse assembly are examined by a programmer during debugging of the software application.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

What is claimed is:

1. A method for inverse assembly of a software application having a memory image file generated during compiling of programming code, said method comprising the steps of:

determining a logical address indicating a location of a binary code;

searching the memory image file for the logical address;

acquiring the binary code at the logical address from the memory image file, the binary code corresponding to only machine code instructions performed during execution of the software application; and converting the acquired binary code into a first at least one machine code instruction so as to perform the inverse assembly of the compiled programming code for the software application.

2. The method, as claimed in claim 1, wherein said step of determining a logical address further includes the steps of:

probing only an address bus during execution of the software application;

receiving a physical address corresponding to a location of the binary code in memory in response to the step of probing; and converting the received physical address into the logical address.

3. The method, as claimed in claim 1, wherein the memory image file is selected from the group consisting of an S-record file, an elf file, a coff file, a plain binary file and an intel hex file.

4. A method for acquiring binary code during inverse assembly of compiled programming code for a software application using a converter to trigger a physical address in a memory bus via a logic analyzer, said method comprising the steps of:

determining a triggered logical address in the compiled programming code;

inputting the triggered logical address into the converter;

providing a trigger command converting the triggered logical address into a physical address, wherein the physical address corresponding a location where binary code is stored in memory;

supplying the trigger command to the logic analyzer;

triggering the memory bus using the logic analyzer with the trigger command;

acquiring the binary code from the memory bus; and converting the acquired binary code to at least one machine code instruction or a data value so as to perform inverse assembly on the software application.

5. The method, as claimed in claim 4, wherein said step of determining the triggered logical address further includes the step of:

pointing to a source code line of the software application, the source code corresponding to the triggered logical address.

6. The method, as claimed in claim 4, wherein the trigger command comprises a plurality of trigger commands.

7. The method, as claimed in claim 4, wherein said step of providing a trigger command further includes the step of:

displaying the trigger command to a user.

8. The method, as claimed in claim 7, wherein said step of supplying the trigger command further includes the step of;

manually inputting the trigger command into the logic analyzer.

9. The method, as claimed in claim 4, wherein the memory bus comprises an address bus, a data bus and a status bus.

10. A method for acquiring binary code during inverse assembly of compiled programming code for a software application having a memory image file generated during compiling of the programming code and that uses a converter to trigger a physical address in a memory bus via a logic analyzer, said method comprising the steps of:

determining a triggered logical address in the compiled programming code;

inputting the triggered logical address into the converter;

providing a trigger command converting the triggered logical address into a physical address, wherein the physical address corresponds to binary code stored in memory;

supplying the trigger command to the logic analyzer;

triggering the memory bus using the logic analyzer with the trigger command;

acquiring the physical address corresponding to binary code stored in memory;

converting the acquired physical address into a logical address;

searching the memory image file for the logical address;

acquiring the binary code at the logical address from the memory image file, the binary code corresponding to only machine code instructions performed during execution of the software application; and converting the acquired binary code into a first at least one machine code instructions so as to perform the inverse assembly of the compiled programming code for the software application.

11. The method, as claimed in claim 10, wherein the memory image file is selected from the group consisting of an S-record file, an elf file, a coff file, a plain binary file and an intel hex file.

12. The method, as claimed in claim 10, wherein the logical command comprises a plurality of logical commands.

13. The method, as claimed in claim 10, wherein said step of determining the triggered logical address further comprises the step of:

pointing to a source code line of the software application, the source code corresponding to the triggered logical address.

14. The method, as claimed in claim 10, wherein said step of providing a trigger command further includes the steps of:

displaying trigger commands to a user.

15. The method, as claimed in claim 14, wherein said step of supplying the trigger command further includes the steps of:

manually inputting the trigger command into the logic analyzer.

16. The method, as claimed in claim 10, wherein the memory bus comprises an address bus and a status bus.

17. An apparatus for acquiring binary code during inverse assembly of compiled programming code for a software application having a memory image file generated during compiling of the programming code, said apparatus having a converter and logic analyzer that triggers a physical address in a memory bus, said apparatus comprising:

means for determining a triggered logical address in the compiled programming code;

means for inputting the triggered logical address into the converter;

means for providing a trigger command converting the triggered logical address into a physical address storing binary code in memory;

means for supplying the trigger command to the logic analyzer;

means for triggering the memory bus using the logic analyzer with the trigger commands;

means for acquiring the physical address from the triggered memory bus corresponding to binary code stored in memory;

means for converting the physical address into the logical address;

means for searching the memory image file for the logical address;

means for acquiring the binary code at the logical address from the memory image file, the binary code corresponding to only machine code instructions performed during execution of the software application; and means for converting the acquired binary code into a first at least one machine code instructions, whereby inversely assembling the compiled programming code for the software application.

18. The apparatus, as claimed in claim 17, wherein the memory image file is selected from the group consisting of an S-record file, an elf file, a coff file, a plain binary file and an intel hex file.

19. The apparatus, as claimed in claim 17, wherein the logical command comprises a plurality of logical commands.

20. The apparatus, as claimed in claim 17, wherein the memory bus comprises an address bus and a status bus.

* * * * *